(12) United States Patent
Almond

(10) Patent No.: US 11,455,476 B2
(45) Date of Patent: Sep. 27, 2022

(54) LANGUAGE TRANSLATION AID

(71) Applicant: TSTREET PTY LTD, Newcastle (AU)

(72) Inventor: Benjamin Price Almond, Brisbane (AU)

(73) Assignee: TStreet Pty Ltd, Newcastle (AU)

( * ) Notice: Subject to any disclaimer, the term of this patent is extended or adjusted under 35 U.S.C. 154(b) by 180 days.

(21) Appl. No.: 16/499,815

(22) PCT Filed: Apr. 3, 2018

(86) PCT No.: PCT/AU2018/050304
§ 371 (c)(1),
(2) Date: Sep. 30, 2019

(87) PCT Pub. No.: WO2018/184062
PCT Pub. Date: Oct. 11, 2018

(65) Prior Publication Data
US 2020/0104546 A1 Apr. 2, 2020

(30) Foreign Application Priority Data

Apr. 5, 2017 (AU) .............................. 2017901233

(51) Int. Cl.
*G06F 40/58* (2020.01)
*G06F 40/242* (2020.01)
*G06F 40/51* (2020.01)

(52) U.S. Cl.
CPC ............ *G06F 40/58* (2020.01); *G06F 40/242* (2020.01); *G06F 40/51* (2020.01)

(58) Field of Classification Search
CPC ........ G06F 40/10; G06F 40/263; G06F 40/42; G06F 40/58
See application file for complete search history.

(56) References Cited

U.S. PATENT DOCUMENTS 5,275,569 A * 1/1994 Watkins ................. G09B 19/06
434/156
5,432,948 A * 7/1995 Davis ...................... G06F 40/55
704/2

(Continued)

FOREIGN PATENT DOCUMENTS

CN       105740314 A    7/2016
JP       S56-114073 A    9/1981

(Continued)

OTHER PUBLICATIONS

Triest, Johannes, "Extended European Search Report Regarding European Patent Application No. 18781857", dated Oct. 22, 2020, p. 9, Published in: EP.

(Continued)

*Primary Examiner* — Jesse S Pullias
(74) *Attorney, Agent, or Firm* — Neugeboren O'Dowd PC

(57) ABSTRACT

The present invention relates to an electronic language translation aid. The aid includes a receiver for receiving a language sentence in a first language. The translator translates the language sentence into both a literal translation and a correct translation in a second language. The display displays the literal translation and the correct translation. Preferably, the display is configured to display both translations concurrently so that an early language learner can obtain an immediate comprehension of individual word meaning through literal translation, and overall contextual meaning through the correct translation.

23 Claims, 5 Drawing Sheets

(56) References Cited

U.S. PATENT DOCUMENTS

| | | | |
|---|---|---|---|
| 5,486,111 A | | 1/1996 | Watkins |
| 6,438,515 B1 | | 8/2002 | Crawford et al. |
| 8,041,556 B2 | * | 10/2011 | Chen ............... G06F 40/53 |
| | | | 704/5 |
| 8,180,625 B2 | * | 5/2012 | Noda ............... G06F 40/47 |
| | | | 704/4 |
| 2003/0040899 A1 | * | 2/2003 | Ogilvie ............. G06F 40/58 |
| | | | 704/2 |
| 2014/0303960 A1 | | 10/2014 | Orsini |
| 2015/0262209 A1 | | 9/2015 | Orsini et al. |
| 2016/0335254 A1 | * | 11/2016 | Issaev ............. G06F 40/268 |
| 2016/0350290 A1 | * | 12/2016 | Fujiwara ............. G06N 20/00 |

FOREIGN PATENT DOCUMENTS

| | | |
|---|---|---|
| JP | S56114073 A | 9/1981 |
| JP | H04-181471 A | 11/1990 |
| JP | H03-135666 A | 6/1991 |
| JP | H09-6787 A | 6/1995 |
| JP | H11-184855 A | 7/1999 |
| JP | 2007-515019 A | 6/2007 |
| JP | 2007515019 A | 6/2007 |
| JP | 2007-286925 A | 11/2007 |
| JP | 2014-238808 A | 12/2014 |
| JP | 2014238808 A | 12/2014 |
| JP | 2016-509312 A | 3/2016 |
| WO | 2003017229 A1 | 2/2003 |
| WO | 2005059702 A2 | 6/2005 |
| WO | 2006127965 A2 | 11/2006 |

OTHER PUBLICATIONS

Beaver Builder, "Translations", [online], Feb. 22, 2017, [retrieved on Dec. 5, 2019], Retrieved from the internet: URL<https://web.archive.org/eb/20170222201502/https://kb.wpbeaverbuilder.com/article/21-translations>.

Wikipedia, "Interlinear Gloss", [online], Mar. 12, 2017, [retrieved on Dec. 5, 2019], Retrieved from the internet: URL<https://web.archive.org/web/20170321133425/https://en.wikipedia.org/wiki/Interlinear_gloss>.

www.zompist.com, "The Language Construction Kit", [online], Sep. 30, 1999, [retrieved on Dec. 5, 2019], Retrieved from the internet: URL<https://web.archive.org/web/19990930204743/https://www.zompist.com/kitgram.html>.

Miller, Neil, "International Search Report and Written Opinion Re International Application PCT/AU2018/050304", dated Jun. 20, 2018, p. 9, Published in: AU.

Miller, Neil, "International Preliminary Report On Patentability Re PCT/AU2018/050304", dated Mar. 14, 2019, p. 5, Published in: AU.

Yukiko Chou, "Notification of Reasons for Rejection Regarding Patent Application No. 2019-555119", dated Sep. 7, 2021, p. 13, Published in: JP.

Office Action received for Japanese Patent Application Serial No. 2019-555119 dated May 10, 2022, 11 pages.

Triest, Johannes, "Office Action dated Jun. 2, 2022 Reference To Application No. 18 781 857.0-1203", Jun. 2, 2022, pp. 7, Publisher: EPO, Published in: EP.

* cited by examiner

|     | Example |     |       |       |     |
|-----|---------|-----|-------|-------|-----|
| 110 — Indirect | I | am | eight | years | old |
| 108 — Direct | I | have | eight | years |     |
| 104 — French | J' | ai | huit | ans |     |

300

104 — Original Una mañana de invierno, un coche tirado por tres caballos pasó por en medio de Uzquiano, 108 — Word by Word [A ∨][morning ∨][of ∨][winter ∨][a ∨][car ∨][pulled ∨]
[by ∨][three ∨][horses ∨][passed ∨][by ∨][in ∨][middle ∨][of ∨]
[Uzquiano ∨]

110 — Fluent [One winter morning a wagon pulled by three horses drove through the town of Uzquiano ∨]

104 — Original y sin detenerse siguió camino de Peñacerrada.

108 — Word by Word [and ∨][without ∨][stop ∨][follow ∨][path ∨][of ∨]
[Peñacerrada ∨]

110 — Fluent [and without stopping followed the path to Peñacerrada. ∨]

Back to Library    About This Document    Font Size                     Original    Word by Word    Fluent UNA mañana de Invierno, un coche tirado por tres caballos
One morning from winter, a car pulled by three horses
One winter morning, a car pulled by three horses passed through Uzq| quiano, y
                                                                       quiano, Y
                                                                       ued 104 — sin    detenerse siguió    camino de    Peñacerrada.
108 — without stop    followed path    from Peñacerrada.
110 — on    his    way    to    Peñacerrada.
                            502

| TRANSLATION SUGGESTION |
| From Spanish to English |
| ORIGINAL |
| detenerse siguió camino |
| CURRENT TRANSLATION |
| followed |
| ALTERNATIVE TRANSLATIONS |
| Continue |
| Pursue |
| Proceed |
| Go After |
| SUGGEST NEW TRANSLATION |
| [                    ] |
| [Suggest New Translation] |
| Previously Suggested Translations |
| followed          [vote] |

504

El coche    había    salido    de    Vitoria    horas antes y lle    hita vestida de
He car    there was    stepped out    from Victoria    hours before Y wo    clothed from
The car had left Victoria hours earlier and had three travelers; a little g

Figure 5

LANGUAGE TRANSLATION AID

TECHNICAL FIELD

The present invention relates to a language translation aid.

BACKGROUND

The reference to any prior art in this specification is not, and should not be taken as an acknowledgement or any form of suggestion that the prior art forms part of the common general knowledge.

There is an increased emphasis in Australian schools to learn a second language.

In practice, many early learners of a language struggle with the concept that a correctly translated sentence does not directly correspond with the original sentence being translated. In some languages, particularly French and German, the ordering of words in the grammatically correct translation are rearranged out of sync when compared with the English original which is confusing.

The preferred embodiment provides an aid to assist early language learners.

SUMMARY OF THE INVENTION

According to one aspect of the present invention, there is provided an electronic language translation aid including:

a receiver for receiving a language sentence in a first language;

a translator for translating the language sentence into both a literal translation and a correct translation in a second language; and a display for displaying the literal translation and the correct translation.

The aid may include a builder for building a library of previously translated words to increase translation speed. The builder may serially build the library of each translated word.

The translator may serially translate the sentence into the literal translation, word by word. When translating a word in the sentence, the aid may concurrently populate the literal translation or other documents with the translated word for each instance of the word, before proceeding with translating any other words. The correct translation may be serially prepared during translation into the literal translation.

The aid may further include a teaching tool to teach improved translations of a word. The aid may enable a user to select a translated word, and then select or enter a preferred translated word. The preferred translated word may appear in a group or list of alternative suggestions. The preferred translated word may be used in future translations. The preferred translated word may be used to improve translations using machine learning.

Preferably, the display is configured to display both translations concurrently so that an early language learner can obtain an immediate comprehension of individual word meaning through literal translation, and overall contextual meaning through the correct translation. The display may display the first language, literal translation and then the correct translation, in that order. The first language, literal translation and then the correct translation may be displayed in an alignment of corresponding words.

The aid may include a filter for filtering the literal translation or the correct translation on display to enable a user to test themselves based upon ability. The filter may block out or at least partially obscure (e.g. ghost or grey-scale) one or both of the translations. Alternatively, the filter can block out the received language sentence to perform a reverse test.

The translator may include Google™ translate or similar (e.g. Google Cloud Translation API https://cloud.google.com/translate/markup).

According to another aspect of the present invention, there is provided an electronic language translation aid including:

a receiver for receiving a language sentence in a first language for input to a translator; and a display for displaying a translated literal translation and a correct translation in a second language from the translator.

According to another aspect of the present invention, there is provided an electronic language translation method including:

receiving a language sentence in a first language for input to a translator; and displaying a translated literal translation and a correct translation in a second language from the translator.

The step of receiving may involve formatting the sentence for input into the translator. The formatting may involve partitioning the sentence into words to obtain the literal translation of each word, and then reassembling the translated words to form the literal translation. The formatting may further involve partitioning characters in the sentence into Romanic equivalent words for input into the translator.

The sentence may be provided into the translator as a string to obtain the correct translation in return.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 3 is a translation screenshot of the language-translation aid of FIG. 1;

FIG. 5 shows a teaching tool of the language-translation aid of FIG. 1.

DETAILED DESCRIPTION OF PREFERRED EMBODIMENTS

Figure 1:
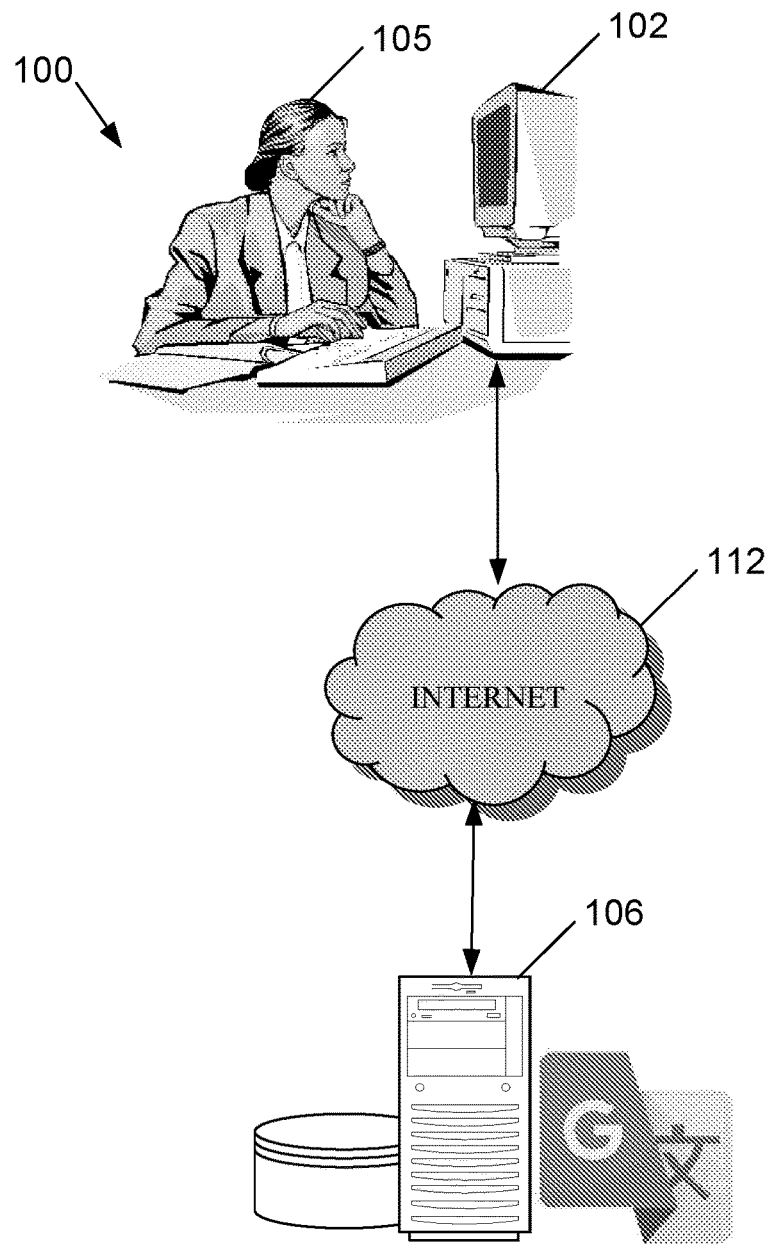
FIG. 1 is a schematic diagram of a electronic language translation aid in accordance with an embodiment of the present invention.

According to a preferred embodiment of the present invention, there is provided a distributed-electronic language-translation aid 100 as shown in FIG. 1. The aid 100 includes a user interface on a computer 102 for receiving a language sentence 104 in French (i.e. a first language) from an early language learner 105. An electronic translator 106 is provided for translating the French language sentence 104 into both a literal translation 108 and a grammatically correct translation 110 in English (i.e. a second language).

A display of the computer 102 displays the input French sentence 104, the output English literal (or direct) translation 108 and the output English correct (or indirect) translation 110, in that order as shown in FIG. 1. Of course, the reverse order could also be used. The display is configured to display both English translations 108, 110 concurrently so that the early language learner 105 can obtain an immediate comprehension of individual word meaning through the literal translation 108, and overall contextual meaning through the correct translation 110. The display of both English translations 108, 110 allows the learner 105, who is a native English speaker, to become instantly immersed into the French language to facilitate learning and understanding.

The translator 106 includes a web server (e.g. Google™ translate) in communication with the learner's computer 102 over the Internet 112. The computer 102 is loaded with or remotely accesses translation software which communicates with the translator 106 to perform the translations 108, 110.

The aid 100 further includes a filter for filtering either of the literal translation 108 or the correct translation 110 on display to enable the improving learner 105 to test themselves based upon ability. The filter may block out or at least partially obscure (e.g. ghost or grey-scale) one or both of the translations 108, 110. Alternatively, the filter can block out the input French sentence 104 to perform a reverse test. The input French sentence 104, the output English literal translation 108 and the output English correct translation 110 are displayed as a grid so as to align corresponding words to facilitate understanding.

Figure 2:
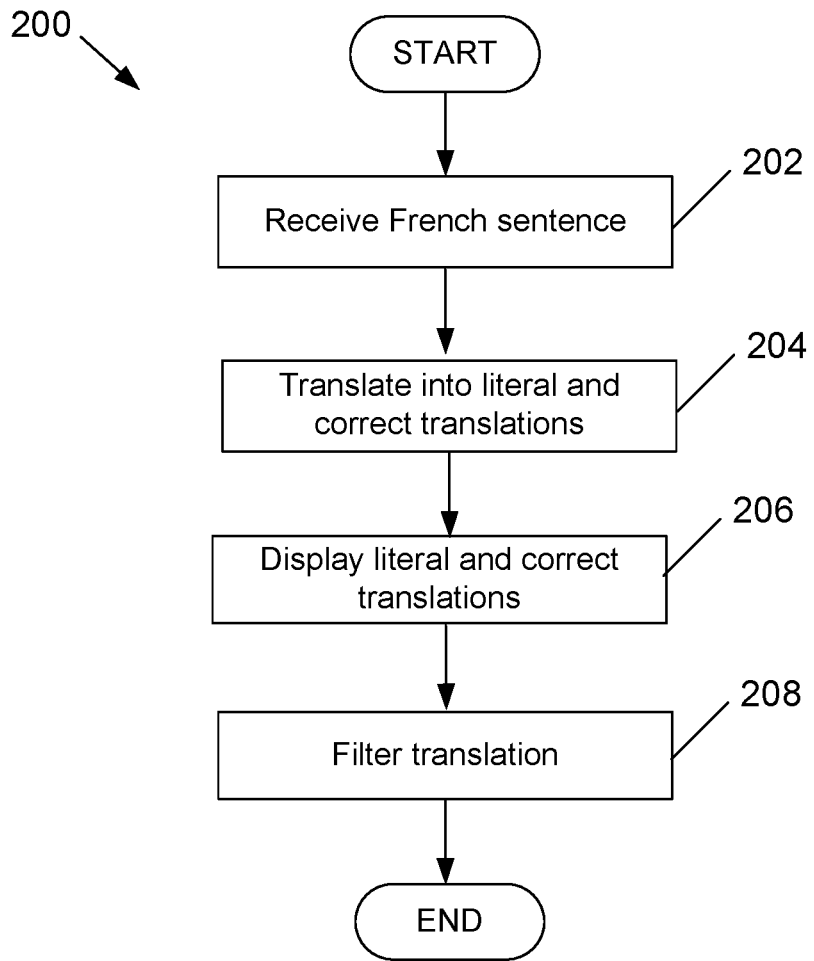
FIG. 2 is a flowchart of an electronic language translation method performed using the aid of FIG. 1.

An electronic language translation method 200 performed using the aid 100 is now described with reference to FIG. 2.

At step 202, the learner's computer 102 receives the language sentence 104 in French for input to the translator 106. In particular, the learner 105 types the sentence 104 using a keyboard of the computer 102. Alternatively, the learner 105 can uses their computer 102 to access a pre-translated book or upload a document including sentences to be translated. Further, the learner 105 can highlight web-text using a chrome extension.

The computer 102, executing or remotely accessing the translation software, formats the sentence 104 for input into the translator 106. The formatting involves partitioning the sentence 104 into individual words to obtain the literal translation of each word from the translator 106, and then reassembling the translated words to form the literal translation 108. The whole sentence 104 is also passed to the translator 106 as a string to obtain the correct translation 110 in return.

At step 204, the translator 106 sequentially translates the sentence 104 into the literal translation 108 and grammatically correct translation 110 in English.

At step 206, computer 102 concurrently displays the literal translation 108 and grammatically correct translation 110. This can be the default display mode, however, early learners 105 can also use the filter once more experience is gained to test themselves. Learners 105 can also customize the appearance of the translations 108, 110.

At step 208, the aid 100 filters out from display either the literal translation 108 or the correct translation 110 to enable the learner 105 to test themselves for future translations. In particular, the learner 105 sets the filter so that future translated outputs based upon the input French sentence are filtered in accordance with the learner's preference.

FIG. 3 shows a Spanish translation screenshot 300 of language-translation aid 100 where like reference numerals refer to like features previously described.

Figure 4:
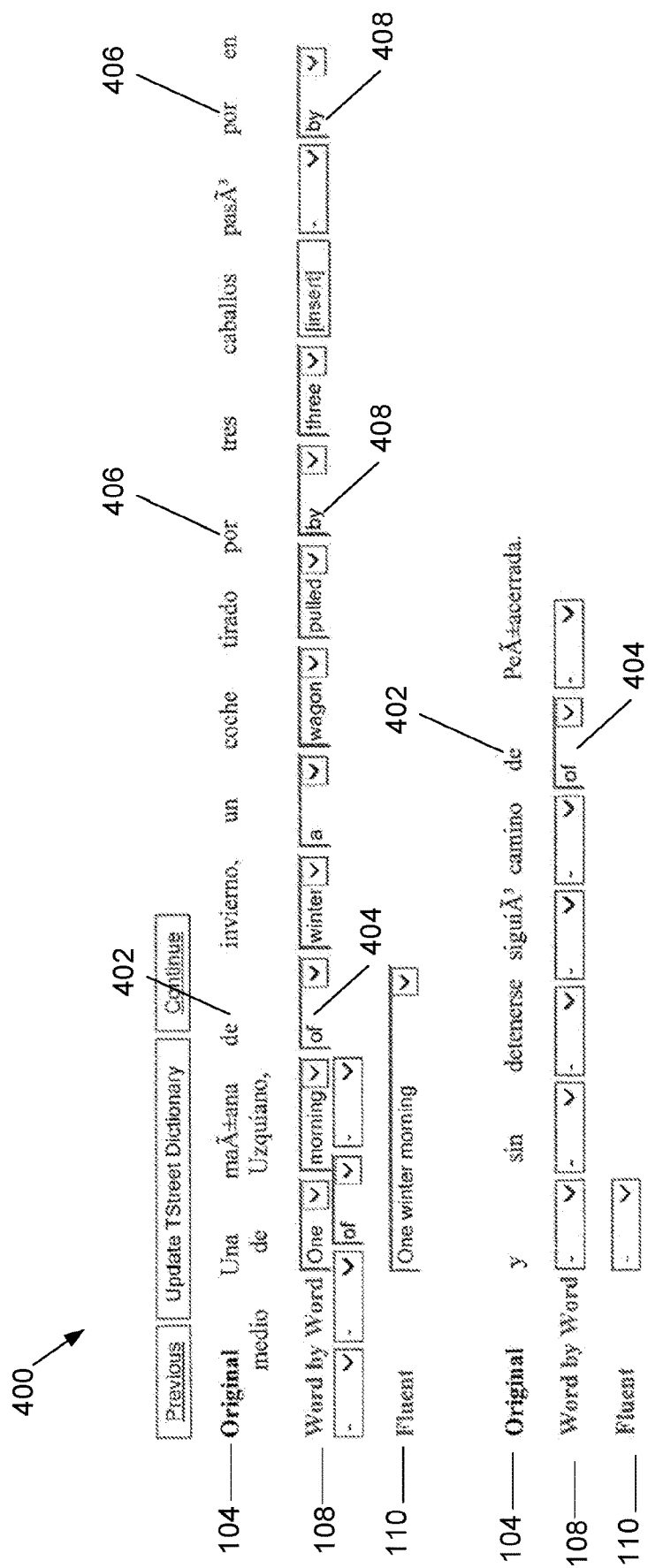
FIG. 4 shows a builder 400 resulting in the translation screenshot of FIG. 3.

Turing to FIG. 4, the aid 100 includes a builder 400 for building a local library of previously translated words to increase translation speed. The library is stored in a database for immediate recall of previously translated words, rather than once again conducting word translation of already translated words using the translator 106.

The translation speed is also increased by serial translation as follows.

The translator 106 serially translates the sentence 104 into the literal translation 108, word by word, and the aid 100 serially builds the library of each translated word. When translating a word 402, 406 in the sentence 104, the aid 100 concurrently populates the literal translation 108 or other documents with the translated word 404, 408 for each instance of the word 402, 406, before proceeding with translating any other words. In FIG. 4, the Spanish word "por" is translated, and the literal translation 108 is populated with the translated word "by" 408 for each instance of the word "por" 406 in the sentence 104, before proceeding with translating the words "tres", "caballos" and "pasA" in between the two instances of "por".

The grammatically correct translation 110 is also serially prepared during translation into the literal translation 108.

FIG. 5 shows a teaching tool 500 to teach the aid 100 improved translations of a word. The user 105 can select a translated word 502 in the literal translation 108, and then select a preferred translated word 504 from a list of alternative suggestions. The preferred translated word 504 can be used in the future instead, or may be used as an input into a machine learning algorithm that improves translations based upon context of the whole translation.

Similarly, the user 105 can select the grammatically correct translation 110, and then select a preferred translation from a list of alternative suggestions. The preferred translation can be used in the future instead, or may be used as an input into a machine learning algorithm that improves translations based upon context of the whole translation.

A person skilled in the art will appreciate that many embodiments and variations can be made without departing from the ambit of the present invention.

The skilled person will understand that the aid 100 is suitable for translating many languages other than English and French. For character languages (such as Japanese, Chinese, or Arabic etc.), the formatting may further involve partitioning characters in a sentence into Romanic equivalent words (e.g "romaji") for subsequent input into the translator 106.

The preferred embodiment was described in relation to a personal computer 102 as a user interface. In other embodiments, documents may be received by other types of receivers (e.g. servers) for translation and processing. In one embodiment, the language sentence 104 to be translated is received from a document in a storage device, and the translated literal translation 108 and correct translation 110 are subsequently stored in the document (or a new document) for display upon loading by the computer 102.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or can embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The claims defining the invention are as follows:

1. An electronic language translation aid including:
   a receiver configured to receive a language sentence in a first language;
   a translator having a processor configured to serially translate the language sentence into both a literal translation and a correct translation in a second language; and
   a display configured to display the literal translation and the correct translation;
   wherein, when serially translating a word in the language sentence, the processor is configured to concurrently populate each instance of the word in the literal translation with the translated word, before proceeding with translating any other words.

2. An electronic language translation aid as claimed in claim 1, further including a builder for building a library of previously translated words to increase translation speed.

3. An electronic language translation aid as claimed in claim 2, wherein the builder serially builds the library of each translated word.

4. An electronic language translation aid as claimed in claim 1, wherein the translator serially translates the sentence into the literal translation, word by word.

5. An electronic language translation aid as claimed in claim 1, wherein the correct translation is serially prepared during translation into the literal translation.

6. An electronic language translation aid as claimed in claim 1, further including a teaching tool to teach improved translation of a word.

7. An electronic language translation aid as claimed in claim 1, enabling a user to select a translated word or sentence, and then select or enter a preferred translated word or sentence.

8. An electronic language translation aid as claimed in claim 7, wherein the preferred translated word or sentence appears in a group or list of alternative suggestions.

9. An electronic language translation aid as claimed in claim 7, wherein the preferred translated word or sentence is used in future translations.

10. An electronic language translation aid as claimed in claim 7, wherein the preferred translated word or sentence is used to improve translations using machine learning or artificial intelligence.

11. An electronic language translation aid as claimed in claim 1, wherein the display is configured to display both translations concurrently so that an early language learner can obtain an immediate comprehension of individual word meaning through literal translation, and overall contextual meaning through the correct translation.

12. An electronic language translation aid as claimed in claim 11, wherein the display displays the first language, literal translation and then the correct translation, in that order.

13. An electronic language translation aid as claimed in claim 1, wherein the first language, literal translation and/or the correct translation are displayed in a grid of corresponding words.

14. An electronic language translation aid as claimed in claim 1, further including a filter for filtering the literal translation or the correct translation on display to enable a user to test themselves based upon ability.

15. An electronic language translation aid as claimed in claim 14, wherein the filter blocks out or at least partially obscures one or both of the translations.

16. An electronic language translation aid including:
    a receiver configured to receive a language sentence in a first language for input to a translator; and
    a display configured to display a serially translated literal translation and a correct translation in a second language from the translator, the display being further configured to enable a user to select or enter a preferred translated word or sentence to improve translations using machine learning or artificial intelligence;
    wherein, when serially translating a word in the language sentence, the aid is configured to concurrently populate each instance of the word in the literal translation with the translated word, before proceeding with translating any other words.

17. An electronic language translation method including:
    receiving a language sentence in a first language for input to a translator; and
    displaying a serially translated literal translation and a correct translation in a second language from the translator; and
    in response to serially translating a word in the language sentence, concurrently populating, using a processor, each instance of the word in the literal translation with the translated word, before proceeding with translating any other words.

18. An electronic language translation method as claimed in claim 17, wherein the step of receiving involves formatting the sentence for input into the translator.

19. An electronic language translation method as claimed in claim 18, wherein the formatting involves partitioning the sentence into words to obtain the literal translation of each word, and then reassembling the translated words to form the literal translation.

20. An electronic language translation method as claimed in claim 18, wherein the formatting involves partitioning characters in the sentence into Romanic equivalent words for input into the translator.

21. An electronic language translation method as claimed in claim 17, wherein the sentence is provided into a translator as a string to obtain the correct translation in return.

22. An electronic language translation method as claimed in claim 17, wherein the language sentence is received from a storage device.

23. An electronic language translation method as claimed in claim 17, wherein the translated literal translation and a correct translation are stored in a storage device for display.

* * * * *